United States Patent
Wang et al.

(10) Patent No.: US 12,272,820 B2
(45) Date of Patent: Apr. 8, 2025

(54) ELECTRODE MATERIALS COMPRISING A LAYERED SODIUM METAL OXIDE, ELECTRODES COMPRISING THEM AND THEIR USE IN ELECTROCHEMISTRY

(71) Applicant: HYDRO-QUÉBEC, Montréal (CA)

(72) Inventors: Yuesheng Wang, Longueuil (CA); Abdelbast Guerfi, Brossard (CA); Karim Zaghib, Longueuil (CA); Gilles Lajoie, Varennes (CA); Marie-Josée Vigeant, Varennes (CA)

(73) Assignee: HYDRO-QUÉBEC, Montréal (CA)

( * ) Notice: Subject to any disclaimer, the term of this patent is extended or adjusted under 35 U.S.C. 154(b) by 523 days.

(21) Appl. No.: 17/276,558

(22) PCT Filed: Oct. 2, 2019

(86) PCT No.: PCT/CA2019/051412
§ 371 (c)(1),
(2) Date: Mar. 16, 2021

(87) PCT Pub. No.: WO2020/069618
PCT Pub. Date: Apr. 9, 2020

(65) Prior Publication Data
US 2022/0052330 A1     Feb. 17, 2022

Related U.S. Application Data

(60) Provisional application No. 62/740,185, filed on Oct. 2, 2018.

(51) Int. Cl.
*H01M 4/505* (2010.01)
*C01G 45/1228* (2025.01)
(Continued)

(52) U.S. Cl.
CPC ........ *H01M 4/505* (2013.01); *C01G 45/1228* (2013.01); *C01G 51/42* (2013.01);
(Continued)

(58) Field of Classification Search
CPC .... C01G 45/1228; C01G 51/42; C01G 51/50; C01G 53/50; C01P 2002/72;
(Continued)

(56) References Cited

U.S. PATENT DOCUMENTS

| 7,897,674 B2 | 3/2011 | Zaghib et al. |
| 8,828,609 B2 | 9/2014 | Zaghib et al. |

(Continued)

FOREIGN PATENT DOCUMENTS

| CN | 103078100 A | * 5/2013 | ............ H01M 4/505 |
| CN | 105 185 978 A | 12/2015 | |

(Continued)

OTHER PUBLICATIONS

Machine translation CN103078100A (Year: 2013).*

(Continued)

*Primary Examiner* — Victoria H Lynch
(74) *Attorney, Agent, or Firm* — Womble Bond Dickinson (US) LLP

(57) ABSTRACT

The present technology relates to electrode materials comprising an electrochemically active material, wherein the electrochemically active material comprises a P2-type or a O3-type layered sodium metal oxide. The electrochemically active material is of formula $Na_xMO_2$, wherein $0.5 \leq x \leq 1.0$ and M is selected from Co, Mn, Fe, Ni, Ti, Cr, V, Cu, Sb and their combinations. Also described are electrodes, electrochemical cells and batteries comprising the electrode materials.

18 Claims, 10 Drawing Sheets

(51) Int. Cl.

| | |
|---|---|
| *C01G 51/42* | (2025.01) |
| *C01G 51/50* | (2025.01) |
| *C01G 53/50* | (2025.01) |
| *H01M 4/36* | (2006.01) |
| *H01M 4/525* | (2010.01) |
| *H01M 4/62* | (2006.01) |
| *H01M 10/0525* | (2010.01) |
| *H01M 10/054* | (2010.01) |

(52) U.S. Cl.
CPC ............ *C01G 51/50* (2013.01); *C01G 53/50* (2013.01); *H01M 4/366* (2013.01); *H01M 4/525* (2013.01); *H01M 4/623* (2013.01); *H01M 4/625* (2013.01); *H01M 10/0525* (2013.01); *H01M 10/054* (2013.01); *C01P 2002/72* (2013.01); *C01P 2006/40* (2013.01)

(58) Field of Classification Search
CPC ............ C01P 2006/40; H01M 10/052; H01M 10/0525; H01M 10/054; H01M 4/366; H01M 4/505; H01M 4/525; H01M 4/623; H01M 4/625; Y02E 60/10
See application file for complete search history.

(56) References Cited

U.S. PATENT DOCUMENTS

| | | | |
|---|---|---|---|
| 2010/0104944 A1* | 4/2010 | Saito .................. | H01M 10/058 429/231.95 |
| 2010/0129715 A1 | 5/2010 | Saito et al. | |
| 2012/0082897 A1* | 4/2012 | Saito .................. | H01M 4/525 252/182.1 |
| 2018/0090758 A1 | 3/2018 | Xu et al. | |
| 2018/0316058 A1 | 11/2018 | Zaghib et al. | |

FOREIGN PATENT DOCUMENTS

| | | |
|---|---|---|
| CN | 106684369 A | 5/2017 |
| CN | 107004868 A | 8/2017 |
| EP | 3 048 659 A1 | 7/2016 |
| JP | 03-501904 | 4/1991 |
| JP | H03501904 | 4/1991 |
| JP | 2008-270183 A | 11/2008 |
| JP | 2013-203565 | 10/2013 |
| JP | 2014-160653 | 9/2014 |
| JP | 2014 160653 A | 9/2014 |
| JP | 2014-229452 | 12/2014 |
| JP | 2015-176678 | 10/2015 |
| JP | 2015-530960 | 10/2015 |
| JP | 2017010925 A * | 1/2017 |
| WO | 89/04066 | 5/1989 |
| WO | 2003/063287 A2 | 7/2003 |
| WO | 2004/068610 A2 | 8/2004 |
| WO | 2009/111860 A1 | 9/2009 |
| WO | 2014009723 A1 | 1/2014 |
| WO | 2016033422 A1 | 3/2016 |
| WO | 2016085726 A1 | 6/2016 |

OTHER PUBLICATIONS

Machine translation JP2017010925A (Year: 2017).*
M. Satyanarayana, "Synthesis, structural and electrochemical study of O3-NaNi0.4Mn0.4Co0.2O2 as a cathode material for Na-ion batteries", RSC Adv. 2016,6, 61334-61340 (Year: 2016).*
Lorenzo, Z."Large-scale Production of Paper-based Li-ion Cells." Springer International Publishing, 2017, pp. 13-38.
Mortemard de Boisse, B., et al. "Structural and electrochemical characterizations of P2 and New O3-NaxMn1-yFeyO2 Phases prepared by auto-combustion synthesis for Na-ion batteries." J. Electrochem. Soc. 2013, vol. 160, Issue 4, pp. A569-A574.
Yu, Haijun, et al. "Novel titanium-based O3-type NaTi0.5Ni0.5O2 as a cathode material for sodium ion batteries." Chemical Communications, vol. 50, No. 4, (2014), pp. 457-459.
Paulsen, J. M., et al. "O2 Structure Li2/3[Ni1/3Mn2/3]O2: A New Layered Cathode Material for Rechargeable Lithium Batteries. I. Electrochemical Properties." Journal of the Electrochemical Society, vol. 147, No. 3, (2000), pp. 861-868.
Komaba, S., et al. "Thermal behavior of the layered oxide Li2/3Co2/3Mn1/3O2 obtained by ion exchange from the P2-type Na2/3Co2/3Mn1/3O2 phase." The Journal of Physical Chemistry C, vol. 117, No. 7, (2013), pp. 3264-3271.
Robertson, Alastair D., et al. "Layered LixMn1-yCoyO2 Intercalation Electrodes Influence of Ion Exchange on Capacity and Structure upon Cycling." Chemistry of materials, vol. 13, No. 7, (2001), pp. 2380-2386.
Delmas, C., et al. "Characterization of the T#2-Li2/3Co2/3Mn1/3O2 system obtained by lithium ion-exchange." 1 page.
International Search Report (PCT/ISA/210) with translation and Written Opinion (PCT/ISA/237) mailed on Dec. 27, 2019, by the Canada Patent Office as the International Searching Authority for International Application No. PCT/CA2019/051412.
Clément, Raphaële J., et al., "Review—Manganese-Based P2-Type Transition Metal Oxides as Sodium-Ion Battery Cathode Materials", Journal of The Electrochemical Society, 2015, 152(14), pp. A2589-A2604.
Extended European Search Report dated Jun. 2, 2022, issued by the European Patent Office in corresponding European Application No. 19868747.7-1108, with English translation, (15 pages).
Office Action in Japanese Application No. 2021-517953, mailing date Aug. 16, 2023.
Office Action in Japanese Application No. 2021-517953, mailing date Feb. 5, 2024.
Office Action in Chinese Application No. 201980061284.6, mailing date Feb. 5, 2024.
Kalapsazova et al. "Sodium deficient nickel-manganese oxides as intercalation electrodes in lithium ion batteries", Journal of Material Chemistry A, 2014, 2, 19383-19395.
Xu et al., "Synthesis of sodium manganese oxides with tailored multi-morphologies and their application in lithium/sodium ion batteries", RSC Advances, 2014, 4, 30340-30345.
Office Action in Chinese Application No. 201980061284.6, mailing date Aug. 30, 2024.
Liu, Guoqiang, et al. "Synthesis and electrochemical properties of P2-Na2/3Ni1/3Mn2/3O2", Ionics 21 (2015), 1011-1016.

* cited by examiner

ELECTRODE MATERIALS COMPRISING A LAYERED SODIUM METAL OXIDE, ELECTRODES COMPRISING THEM AND THEIR USE IN ELECTROCHEMISTRY

RELATED APPLICATION

This application claims priority, under the applicable law, to U.S. Provisional Patent Application No. 62/740,185 filed on Oct. 2, 2018, the content of which is incorporated herein by reference in its entirety and for all purposes.

TECHNICAL FIELD

The present application relates to the field of electrochemically active materials and their uses in electrochemical applications. More particularly, the present application generally relates to electrode materials comprising a layered sodium metal oxide as an electrochemically active material, electrodes comprising them, their manufacturing processes and their use in electrochemical cells.

BACKGROUND

Layered lithium metal oxides of formula $LiMO_2$ (M=transition metal) such as oxides having a layered structure like lithium cobalt oxide ($LiCoO_2$) and lithium nickel oxide ($LiNiO_2$) are positive electrode materials used commercially in lithium-ion batteries (LIBs). Layered $LiMO_2$ can be categorized according to their stacking geometry. The different types of stacks differ in the oxygenated layers stacking sequence changing the arrangement of the ($MO_2$) sheets as well as the geometry of the sites occupied by the lithium ions. The oxygen environment of the lithium ion can be, for example, octahedral (O), prismatic (P) or tetrahedral (T). Layered $LiMO_2$ can also be characterized by the number of $MO_2$ sheets found within a unit cell. The structure of layered $LiMO_2$ significantly influences the material's electrochemical properties such as its capacity, cyclability, and rate of charge and discharge. Layered P2 and O3 type structures are, for example, of interest for use in electrochemical cells.

One of the main drawbacks of currently used electrode materials comprising layered oxides as electrochemically active materials is their high production cost. For example, an increase in lithium prices could be problematic for the growth of LIBs market share. Indeed, lithium is used in several components of conventional LIBs, such as in positive and negative electrodes and in electrolytes. Supply issues and the cost of lithium are therefore central to the main factors affecting their expansion into some commercial renewable energy applications.

Accordingly, there is a need for the development of new electrode materials. For example, an electrode material comprising a P2 and/or O3 type layered oxide as an electrochemically active material and excluding one or more of the drawbacks of conventional layered oxide materials.

SUMMARY

According to one aspect, the present technology relates to an electrode material comprising an electrochemically active material, said electrochemically active material comprising a layered sodium metal oxide of formula $Na_xMO_2$, wherein $0.5 \leq x \leq 1.0$ and M is selected from Co, Mn, Fe, Ni, Ti, Cr, V, Cu, Sb and their combinations.

In one embodiment, the electrochemically active material comprises a layered sodium metal oxide selected from:
  a P2-type layered sodium metal oxide of formula $Na_xMO_2$, wherein x is a number such that $0.5 \leq x \leq 0.8$ and M is selected from Co, Mn, Fe, Ni, Ti, Cr, V, Cu and their combinations; and
  an O3-type layered sodium metal oxide of formula $Na_xMO_2$, wherein x is a number such that $0.8 \leq x \leq 1.0$ and M is selected from Co, Mn, Fe, Ni, Ti, Cr, V, Cu, Sb and their combinations.

In another embodiment, the electrochemically active material comprises a layered sodium metal oxide of formula $Na_xM'_{1-y}M_yO_2$, wherein x and M are as defined herein and y is a number such that $0 \leq y \leq 1.0$ and M' is different from M and is selected from Co, Mn, Fe, Ni, Ti, Cr, V, Cu, Sb and their combinations.

In another embodiment, the electrochemically active material comprises a layered sodium metal oxide of formula $Na_xM'_{1-y}Mn_yO_2$, wherein x is as defined herein and wherein y is such that $0 \leq y \leq 1.0$ and M' is selected from Co, Fe, Ni, Ti, Cr, V, Cu, Sb and their combinations.

In another embodiment, the electrode material further comprises an electronically conductive material selected from carbon black, acetylene black, graphite, graphene, carbon fibers, carbon nanofibers, carbon nanotubes, and their combinations.

In another embodiment, the electrode material further comprises a binder selected from the group consisting of a polymeric binder of polyether type, a fluorinated polymer, and a water-soluble binder.

According to another aspect, the present technology relates to an electrode comprising the electrode material as defined herein on a current collector. In one embodiment, the electrode is a positive electrode.

According to another aspect, the present technology relates to an electrochemical cell comprising a negative electrode, a positive electrode and an electrolyte, wherein the positive electrode is as defined herein. In one embodiment, the negative electrode comprises metallic lithium. Alternatively, the negative electrode comprises metallic sodium.

In another embodiment, the electrolyte is a liquid electrolyte comprising a salt in a solvent. Alternatively, the electrolyte is a gel electrolyte comprising a salt in a solvent and optionally a solvating polymer. According to another alternative, the electrolyte is a solid polymer electrolyte comprising a salt in a solvating polymer. In one embodiment, the salt is a lithium salt. Alternatively, the salt is a sodium salt.

According to another aspect, the present technology relates to a battery comprising at least one electrochemical cell as defined herein. In one embodiment, the battery is selected from a lithium ion battery and a sodium ion battery.

DETAILED DESCRIPTION

Figure 1:
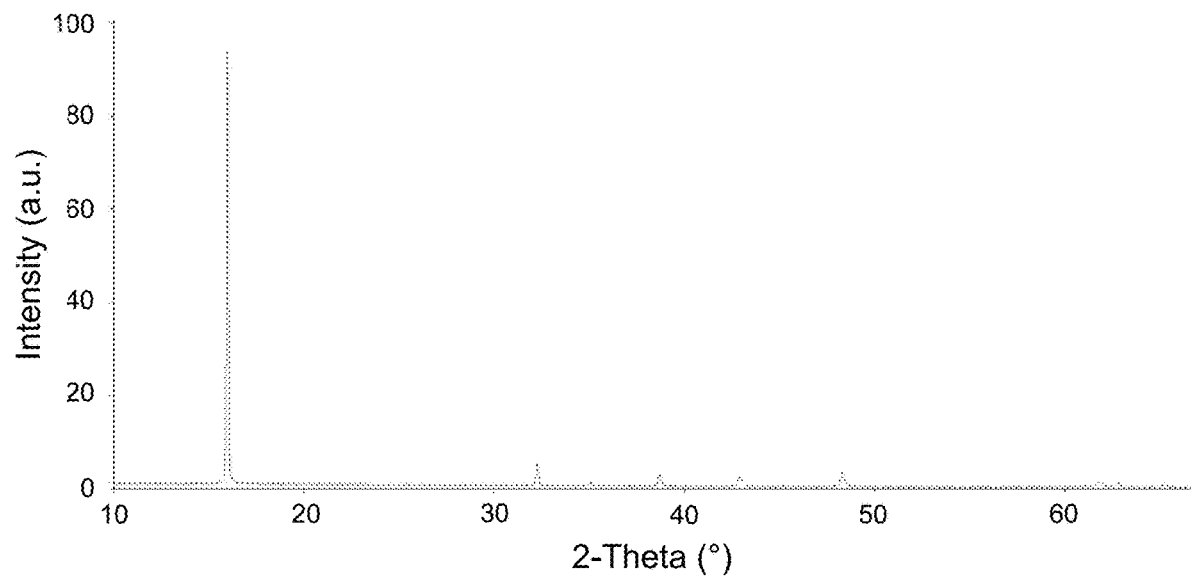
FIG. 1 is an X-ray diffraction pattern for a P2-type layered sodium cobalt oxide powder of formula $Na_{0.5}CoO_2$ obtained using the solid-state process.

The following detailed description and examples are presented for illustrative purposes only and should not be construed as further limiting the scope of the invention.

All technical and scientific terms and expressions used herein have the same definitions as those commonly understood by the person skilled in the art relating to the present technology. The definition of some terms and expressions used is nevertheless provided below.

When the term "approximately" or its equivalent term "about" are used herein, it means in the region of, or around. For example, when the terms "approximately" or "about" are used in relation to a numerical value, it modifies it above and below by a variation of 10% compared to the nominal value. This term can also take into account, for instance, the experimental error of a measuring device or rounding.

When a range of values is mentioned in the present application, the lower and upper limits of the range are, unless otherwise indicated, always included in the definition.

The present technology relates to the use of layered oxides of sodium and at least one metallic element as electrochemically active materials. The layered oxide of sodium and at least one metallic element has a P2-type or O3-type stacking.

In one example, the metallic element is a metal, for instance, a transition metal, a post-transition metal, a metalloid, an alkali metal, an alkaline earth metal, or combinations thereof. For example, the metal is selected from Co, Mn, Fe, Ni, Ti, Cr, V, Cu, Sb and a combination of at least two thereof.

In one example, the electrochemically active material comprises a layered sodium metal oxide of formula $Na_xMO_2$, wherein x is a number such that $0.5 \leq x \leq 1.0$ and M is selected from Co, Mn, Fe, Ni, Ti, Cr, V, Cu, Sb and their combinations.

In another example, the electrochemically active material comprises a P2-type layered sodium metal oxide of formula $Na_xMO_2$, wherein x is a number such that $0.5 \leq x \leq 0.8$ and M is selected from Co, Mn, Fe, Ni, Ti, Cr, V, Cu and their combinations.

In another example, the electrochemically active material comprises an O3-type layered sodium metal oxide of formula $Na_xMO_2$, wherein x is a number such that $0.8 \leq x \leq 1.0$ and M is selected from Co, Mn, Fe, Ni, Ti, Cr, V, Cu, Sb and their combinations.

In another example, the electrochemically active material is a layered sodium cobalt oxide of formula $Na_xCoO_2$, wherein x is as defined herein. For example, the layered sodium cobalt oxide has a P2-type stacking. An example of a layered sodium cobalt oxide has the formula $Na_{0.5}CoO_2$.

In another example, the electrochemically active material is a layered sodium manganese oxide of formula $Na_xMnO_2$, wherein x is as defined herein.

An additional example of an electrochemically active material comprises a mixed layered oxide of formula $Na_xM'_{1-y}M_yO_2$, wherein x and M are as defined herein, y is a number such that $0 \leq y \leq 1.0$ and M' and is selected from Co, Mn, Fe, Ni, Ti, Cr, V, Cu, Sb and their combinations, where M and M' are different.

For example, the electrochemically active material comprises a mixed layered oxide of sodium, manganese and metal of formula $Na_xM'_{1-y}Mn_yO_2$, wherein x and y are as defined herein and M' is selected from Co, Fe, Ni, Ti, Cr, V, Cu, Sb and their combinations. For example, the electrochemically active material is selected from mixed layered oxides of formulae $Na_x(NiCo)_{1-y}Mn_yO_2$, $Na_xCo_{1-y}Mn_yO_2$, $Na_xNi_{1-y}Mn_yO_2$ and $Na_x(CoTi)_{1-y}Mn_{1-y}O_2$, wherein x and y are as defined. Non-limiting examples of electrochemically active material include $Na_{0.5}CoO_2$, $Na_{0.67}CoO_2$, $Na_{0.67}CoO_{0.67}Mn_{0.3302}$, $Na_{0.67}Ni_{0.33}Mn_{0.67}O_2$, $Na_{0.67}CoO_{0.6}Mn_{0.4}O_2$, $Na_{0.67}CoO_{0.55}Mn_{0.45}O_2$, $Na_{0.67}CoO_{0.5}Mn_{0.5}O_2$, $Na_{0.67}CoO_{0.50}Mn_{0.33}Ti_{0.17}O_2$, $Na_{0.6}MnO_2$, $NaNi_{0.4}CoO_{0.2}Mn_{0.4}O_2$, and $NaNi_{0.33}Fe_{0.33}Mn_{0.33}O_2$.

The electrochemically active material can optionally be doped with other elements or impurities included in smaller amounts, for example, to modulate or optimize its electrochemical properties. In some cases, the electrochemically active material can be doped by the partial substitution of the metal (M) by other ions. For example, the electrochemically active material can be doped with a transition metal (e.g. Fe, Co, Ni, Mn, Ti, Cr, Cu, V) and/or a metal other than a transition metal (e.g. Mg, Al, Sb).

The electrochemically active material described herein is preferably substantially free of lithium. For example, the electrochemically active material comprises less than 2 wt. %, less than 1 wt. %, less than 0.5 wt. %, less than 0.1 wt. %, less than 0.05 wt. % or less than 0.01 wt. % of lithium. The electrochemically active material can therefore potentially reduce production costs compared to the corresponding P2-type or O3-type lithium metal oxide structures. The electrochemically active material can also retain the same structure as the corresponding P2-type or O3-type lithium metal oxide structures and have similar electrochemical performances.

The present technology also relates to electrode materials comprising the electrochemically active material as defined herein. In one example, the electrode material as described herein may further comprise an electronically conductive material. Non-limiting examples of electronically conductive materials include carbon black, Ketjen™ carbon, Super P™ carbon, acetylene black, Shawinigan carbon, Denka™ carbon black, graphite, graphene, carbon fibers (e.g. vapor grown carbon fibers (VGCFs)), carbon nanofibers, carbon nanotubes, or a combination of at least two thereof. According to one example, the electronically conductive material is Ketjen™ carbon. According to one alternative, the electronically conductive material is Super P™ carbon. According to another alternative, the electronically conductive material is VGCFs.

The electrode material as described herein can also further comprise a binder. For example, the binder is selected for its compatibility with the various elements of the electrochemical cell. Any known compatible binder is contemplated. For instance, the binder is selected from a polymeric binder of polyether type, a fluorinated polymer, and a water-soluble binder (hydrosoluble). According to one example, the binder is a fluorinated polymer such as polyvinylidene fluoride (PVdF) or polytetrafluoroethylene (PTFE). According to another example, the binder is a water soluble binder such as styrene-butadiene rubber (SBR), acrylonitrile-butadiene rubber (NBR), hydrogenated NBR (HNBR), epichlorohydrin rubber (CHR), or acrylate rubber (ACM), and optionally comprising a thickening agent such as carboxymethyl cellulose (CMC), or a polymer such as poly(acrylic acid) (PAA), poly(methacrylic acid) (PMMA) or a combination thereof. According to one example, the binder is a polymeric binder of polyether type. For example, the polymeric binder of polyether type is linear, branched and/or crosslinked and is based on poly(ethylene oxide) (PEO), poly(propylene oxide) (PPO) or a combination of the two (such as an EO/PO copolymer), and optionally comprises crosslinkable units. In one variant of interest, the binder is PVdF or a polyether type polymer as defined herein.

The electrode material as described herein may further optionally comprise additional components or additives such as inorganic particles, glass or ceramic particles, ionic conductors, salts (for example, lithium salts) and other similar additives.

The present technology also relates to an electrode comprising the electrode material as herein defined on a current collector (for example, aluminum, copper). Alternatively, the electrode may be self-supported. In one variant of interest, the electrode is a positive electrode.

The present technology also relates to an electrochemical cell comprising a negative electrode, a positive electrode and an electrolyte, wherein the positive electrode is as defined herein.

In one example, the electrochemically active material of the negative electrode or of the counter-electrode can be selected from all known compatible materials. For example, the electrochemically active material of the negative electrode can be selected for its electrochemical compatibility with the electrochemically active material as defined herein. For example, the electrochemically active material of the negative electrode may comprise an alkali metal film, for example, a metallic lithium film, a metallic sodium film, or a film of an alloy comprising at least one of these.

The electrolyte is also selected for its compatibility with the various elements of the electrochemical cell. Any type of compatible electrolyte is contemplated. According to one example, the electrolyte is a liquid electrolyte comprising a salt in a solvent. According to one alternative, the electrolyte is a gel electrolyte comprising a salt in a solvent and optionally a solvating polymer. According to another alternative, the electrolyte is a solid polymer electrolyte comprising a salt in a solvating polymer.

The salt is preferably an ionic salt such as a lithium salt or a sodium salt. Non-limiting examples of lithium salts include lithium hexafluorophosphate ($LiPF_6$), lithium bis(trifluoromethanesulfonyl)imide (LiTFSI), lithium bis(fluorosulfonyl)imide (LiFSI), lithium 2-trifluoromethyl-4,5-dicyanoimidazolate (LiTDI), lithium 4,5-dicyano-1,2,3-triazolate (LiDCTA), lithium bis(pentafluoroethylsulfonyl)imide (LiBETI), lithium tetrafluoroborate ($LiBF_4$), lithium bis(oxalato)borate (LiBOB), lithium nitrate ($LiNO_3$), lithium chloride (LiCl), lithium bromide (LiBr), lithium fluoride (LiF), lithium perchlorate ($LiClO_4$), lithium hexafluoroarsenate ($LiAsF_6$), lithium trifluoromethanesulfonate ($LiSO_3CF_3$) (LiTf), lithium fluoroalkylphosphate $Li[PF_3(CF_2CF_3)_3]$(LiFAP), lithium tetrakis(trifluoroacetoxy)borate $Li[B(OCOCF_3)_4]$(LiTFAB), lithium bis(1,2-benzenediolato(2-)-O,O')borate $[B(C_6O_2)_2]$(LiBBB), and their combinations. According to a first variant of interest, the lithium salt is $LiPF_6$. According to a second variant of interest, the lithium salt is LiFSI. According to a third variant of interest, the lithium salt is LiTFSI. Non-limiting examples of sodium salts include the salts described above where the lithium ion is replaced by a sodium ion.

The solvent, if present in the electrolyte, can be a polar aprotic non-aqueous solvent. Non-limiting examples of solvents include cyclic carbonates such as ethylene carbonate (EC), propylene carbonate (PC), butylene carbonate (BC) and vinylene carbonate (VC); acyclic carbonates such as dimethyl carbonate (DMC), diethyl carbonate (DEC), ethylmethyl carbonate (EMC) and dipropyl carbonate (DPC); lactones such as γ-butyrolactone (γ-BL) and γ-valerolactone (γ-VL); acyclic ethers such as 1,2-dimethoxyethane (DME), 1,2-diethoxyethane (DEE), ethoxymethoxyethane (EME), trimethoxymethane and ethylmonoglyme; cyclic ethers such as tetrahydrofuran, 2-methyltetrahydrofuran, 1,3-dioxolane and dioxolane derivatives; and other solvents such as dimethylsulfoxide, formamide, acetamide, dimethylformamide, acetonitrile, propylnitrile, nitromethane, phosphoric acid triesters, sulfolane, methylsulfolane, propylene carbonate derivatives and mixtures thereof.

An electrolyte example comprises lithium hexafluorophosphate ($LiPF_6$) dissolved in a non-aqueous solvent mixture such as a mixture of ethylene carbonate and diethyl carbonate (EC/DEC) ([3:7] by volume) or a mixture of ethylene carbonate and dimethyl carbonate (EC/DMC) ([4:6] by volume).

When the electrolyte is a gel electrolyte or a polymer gel electrolyte, the gel polymer electrolyte can include, for example, a polymer precursor and a salt (for example, a salt as defined above), a solvent and a polymerization and/or crosslinking initiator if necessary. Non-limiting examples of gel electrolytes include, without limitation, the gel electrolytes described in PCT patent application published under numbers WO2009/111860 (Zaghib et al.) and WO2004/068610 (Zaghib et al.).

The electrolyte can also be a solid polymer electrolyte (SPE) comprising a salt in a solvating polymer. Any type of known compatible SPE is contemplated. For instance, the SPE is selected for its compatibility with the various elements of the electrochemical cell. For example, the SPE is selected for its compatibility with lithium and/or sodium. SPEs can generally include a salt as well as one or more solid polar polymer(s), optionally crosslinked. Polyether-type polymers, such as those based on poly(ethylene oxide) (PEO) can be used, but several other compatible polymers are also known for the preparation of SPEs and are also contemplated. According to an example, the polymer may be further crosslinked. Examples of such polymers include branched polymers, for example, star-shaped polymers or comb-shaped polymers such as those described in PCT patent application published under number WO2003/063287 (Zaghib et al.).

A gel electrolyte or a liquid electrolyte as defined above may also impregnate a separator such as a polymer separator. Non-limiting examples of separators include polyethylene (PE), polypropylene (PP), cellulose, polytetrafluoroethylene (PTFE), polyvinylidene fluoride (PVdF) and polypropylene-polyethylene-polypropylene (PP/PE/PP) membranes. For example, the separator is a commercial polymer separator of the Celgard™ type.

The electrolyte can also optionally include additional components or additives such as ionic conductors, inorganic particles, glass or ceramic particles, for example, nanoceramics (such as $Al_2O_3$, $TiO_2$, $SiO_2$ and other similar compounds) and other similar additives.

The present technology also generally relates to a battery comprising at least one electrochemical cell as defined herein. For example, said battery is selected from a lithium battery, a lithium-ion battery, a sodium battery and a sodium-ion battery. According to one variant of interest, the battery is a lithium battery or a lithium-ion battery.

EXAMPLES

The following examples are for illustrative purposes and should not be interpreted as further limiting the scope of the invention as contemplated. These examples will be better understood by referring to the accompanying Figures.

Example 1: Electrochemically Active Materials Synthesis

Layered oxides of formulae $Na_{0.5}CoO_2$, $Na_{0.67}CoO_2$, $Na_{0.67}CoO_{0.67}Mn_{0.33}O_2$, $Na_{0.67}Ni_{0.33}Mn_{0.67}O_2$, $Na_{0.67}CoO_{0.6}Mn_{0.4}O_2$, $Na_{0.67}CoO_{0.55}Mn_{0.45}O_2$, $Na_{0.67}CoO_{0.5}Mn_{0.5}O_2$, $Na_{0.67}CoO_{0.50}Mn_{0.33}Ti_{0.17}O_2$, $Na_{0.6}MnO_2$, $NaNi_{0.4}CoO_{0.2}Mn_{0.4}O_2$ and $NaNi_{0.33}Fe_{0.33}Mn_{0.33}O_2$ were prepared using solid state reaction techniques. The respective precursors ($Na_2CO_3$ and metal oxides such as $Mn_2O_3$, $Co_2O_3$, $NiO$, $Fe_2O_3$ and $TiO_2$) were weighted in order to obtain the desired stoichiometry. The samples were prepared by grinding and mixing the precursor powders. The ground and mixed precursor powders were then put in an oven and heated between 700° C. and 1000° C. under an air or an oxygen atmosphere for 5 to 24 hours.

Example 2: Characterization of Electrochemically Active Materials a) Powder X-Ray Diffraction (XRD)

Figure 2:
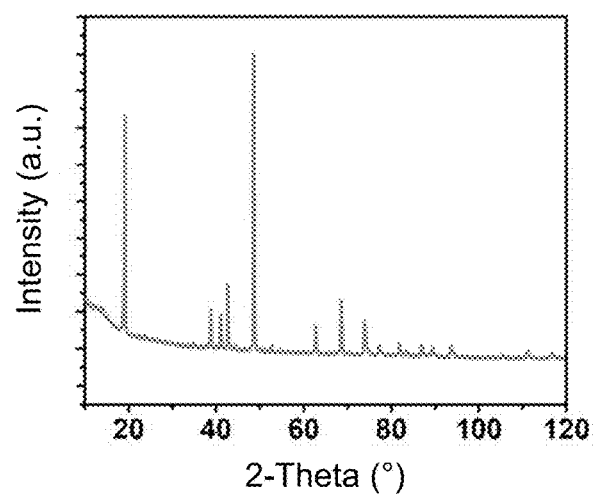
FIG. 2 is an X-ray diffraction pattern for a mixed O3-type mixed layered sodium transition metal oxide powder of formula $NaNi_{0.4}Co_{0.2}Mn_{0.4}O_2$ obtained using the solid-state process.

The atomic and molecular structure of the electrochemically active materials were studied by X-ray diffraction carried out on both P2-type and O3-type layered sodium metal oxide structures prepared in Example 1. FIG. 1 displays the X-ray diffraction pattern for a P2-type layered $Na_{0.5}CoO_2$ powder and FIG. 2 displays the X-ray diffraction pattern for an O3-type layered $NaNi_{0.4}CoO_{0.2}Mn_{0.4}O_2$ powder.

Example 3: Electrochemical Properties

All cells were assembled in 2032 type coin cell casings with the components indicated in Table 1 and negative electrodes including metallic lithium film on aluminum current collectors. The cells comprising liquid electrolytes were assembled with Celgard™ separators impregnated with a 1 M solution of $LiPF_6$ in an EQ/DEC mixture ([3:7] by volume) or an EC/DMC mixture ([4:6] by volume). Cells comprising solid polymer electrolytes were assembled with an SPE comprising LIFSI or LITFSI.

TABLE 1

Cell configurations

| Cell | Electrochemically active material | Electronically conductive material | Binder | Electrolyte |
|---|---|---|---|---|
| Cell 1 | $Na_{0.67}CoO_2$ (80 wt. %) | 10 wt.% | PVdF (10 wt. %) | Liquid |
| Cell 2 | $Na_{0.67}CoO_2$ (75 wt. %) | 24 wt. % | SPE (1 wt. %) | SPE |
| Cell 3 | $Na_{0.67}Co_{0.67}Mn_{0.33}O_2$ (80 wt. %) | 10 wt.% | PVdF (10 wt. %) | Liquid |
| Cell 4 | $Na_{0.67}Ni_{0.33}Mn_{0.67}O_2$ (80 wt. %) | 10 wt. % | PVdF (10 wt. %) | Liquid |
| Cell 5 | $Na_{0.67}Ni_{0.33}Mn_{0.67}O_2$ (75 wt. %) | 24 wt. % | SPE (1 wt. %) | SPE |
| Cell 6 | $Na_{0.67}Co_{0.6}Mn_{0.4}O_2$ (80 wt. %) | 10 wt. % | PVdF (10 wt. %) | Liquid |
| Cell 7 | $Na_{0.67}Co_{0.55}Mn_{0.45}O_2$ (80 wt. %) | 10 wt. % | PVdF (10 wt. %) | Liquid |
| Cell 8 | $Na_{0.67}Co_{0.5}Mn_{0.5}O_2$ (80 wt. %) | 10 wt. % | PVdF (10 wt. %) | Liquid |
| Cell 9 | $Na_{0.67}Co_{0.50}Mn_{0.33}Ti_{0.17}O_2$ (80 wt. %) | 10 wt. % | PVdF (10 wt. %) | Liquid |
| Cell 10 | $Na_{0.6}MnO_2$ (80 wt. %) | 10 wt. % | PVdF (10 wt. %) | Liquid |
| Cell 11 | $NaNi_{0.4}Co_{0.2}Mn_{0.4}O_2$ (80 wt. %) | 10 wt. % | PVdF (10 wt. %) | Liquid | a) Electrochemical Behavior of P2-Type $Na_{0.6}CoO_2$

This example illustrates the electrochemical behavior of a P2-type layered $Na_{0.67}CoO_2$ material as prepared in Example 1.

Figure 3:
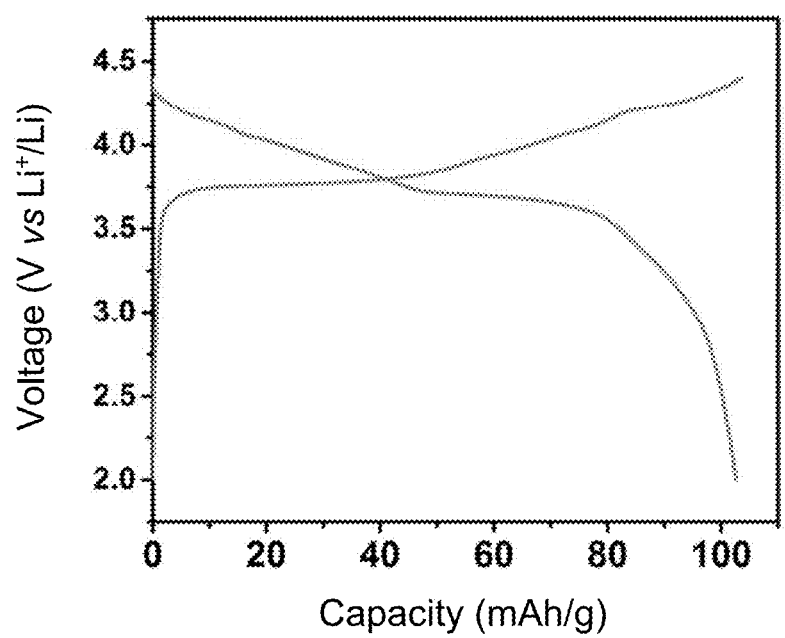
FIG. 3 displays the charge and discharge profiles of Cell 1, the charge and discharge being performed at 0.1 C, and recorded vs $Li/Li^+$ at a temperature of 25° C.

FIG. 3 displays the charge and discharge profiles of Cell 1. The charge and discharge were performed at 0.1 C, and recorded vs Li/Li$^+$ at a temperature of 25° C. Cell 1 delivered a capacity of approximately 104 mAh/g.

Figure 4:
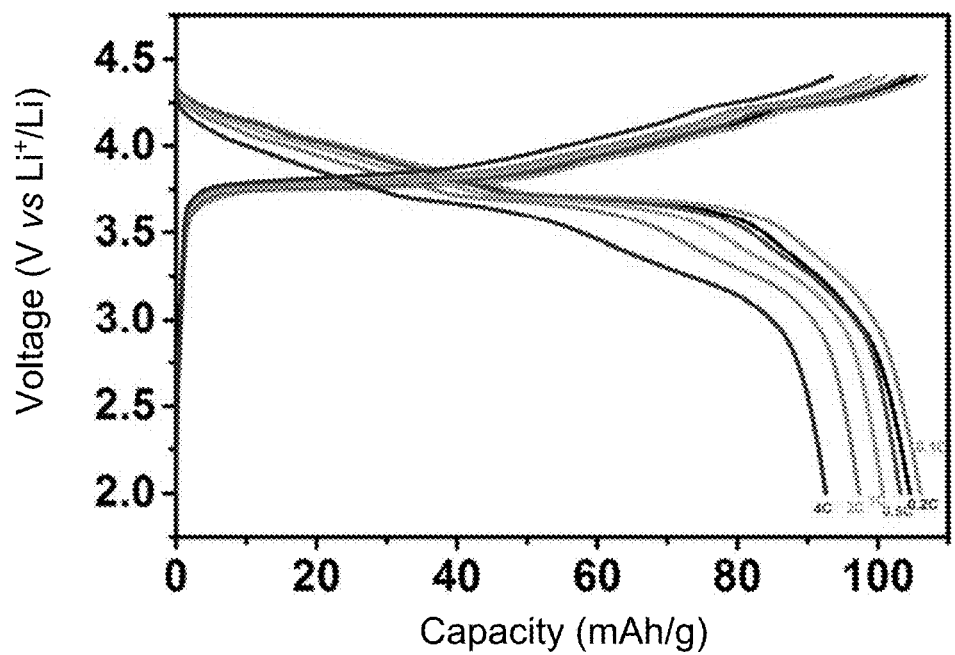
FIG. 4 displays the charge and discharge profiles of Cell 1 at different cycling rates, the charge and discharge being performed at 0.1 C, 0.2 C, 0.5 C, 1 C, 2 C and 4 C and recorded vs Li/Li$^+$ at a temperature of 25° C.

FIG. 4 displays charge and discharge profiles for Cell 1 at different cycling rates. The charge and discharge were performed at 0.1 C, 0.2 C, 0.5 C, 1 C, 2 C and 4 C and recorded vs Li/Li$^+$ at a temperature of 25° C. At a cycling rate of 4 C, Cell 1 delivered a capacity of approximately 92 mAh/g, effectively showing a capacity retention of 87% with increasing cycling rates from 0.5 C to 4 C.

Figure 5:
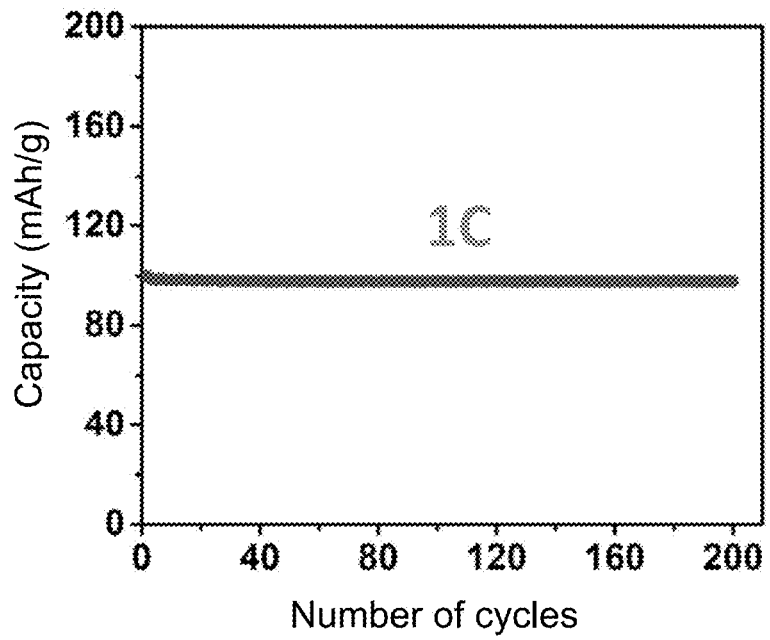
FIG. 5 shows a graph representing the capacity (mAh/g) as a function of the number of cycles, i.e. an aging curve for Cell 1. The long cycling or cycling stability experiment was carried out at a constant charge/discharge current of 1 C and the results were recorded vs Li/Li$^+$ at a temperature of 25° C.

FIG. 5 shows a graph representing the capacity (mAh/g) as a function of the number of cycles for Cell 1. The long cycling experiment was carried out at a constant charge/discharge current of 1 C. The results were recorded vs Li/Li$^+$ at a temperature of 25° C. FIG. 5 shows a capacity retention of about 97% after 200 cycles.

Figure 6:
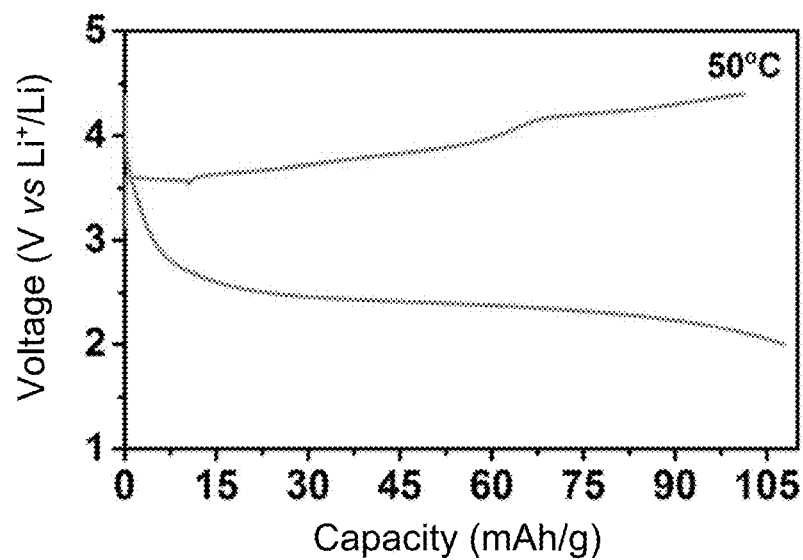
FIG. 6 displays the charge and discharge profiles of Cell 2. The charge and discharge were performed at 0.3 C between 2.0 and 4.4 V vs Li/Li$^+$ at a temperature of 50° C.
Figure 7:
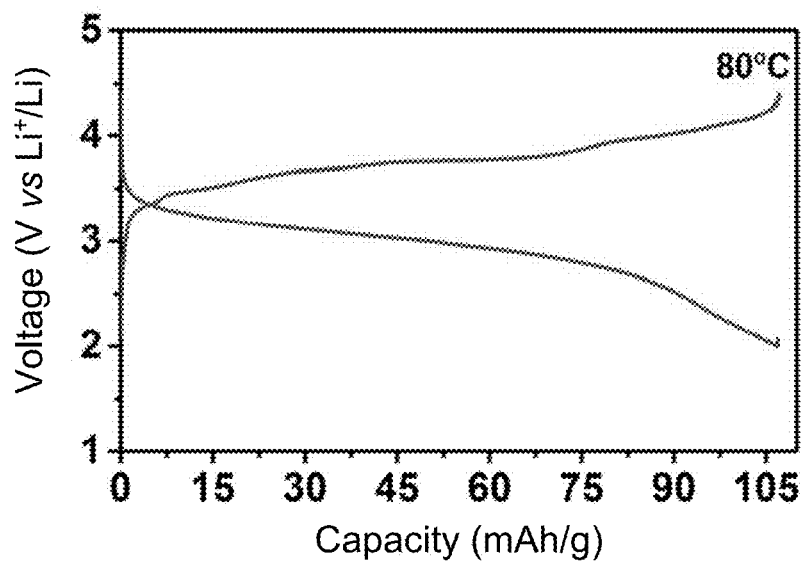
FIG. 7 displays the charge and discharge profiles of Cell 2. The charge and discharge were performed at 0.3 C between 2.0 and 4.4 V vs Li/Li$^+$ at a temperature of 80° C.

The influence of binder selection and cycling temperature is demonstrated in FIGS. 6 and 7.

FIG. 6 displays the charge and discharge profiles of Cell 2. The charge and discharge were performed at 0.3 C between 2.0 and 4.4 V vs Li/Li$^+$ at a temperature of 50° C. Cell 2 delivered a capacity of approximately 107 mAh/g.

FIG. 7 displays the charge and discharge profiles of Cell 2. The charge and discharge were performed at 0.3 C between 2.0 and 4.4 V vs Li/Li$^+$ at a temperature of 80° C. Cell 2 delivered a capacity of approximately 107 mAh/g.

b) Electrochemical Behavior of P2-Type $Na_{0.67}Co_{0.67}Mn_{0.33}O_2$

This example illustrates the electrochemical behavior of a P2-type layered $Na_{0.67}Co_{0.67}Mn_{0.33}O_2$ material as prepared in Example 1.

Figure 8:
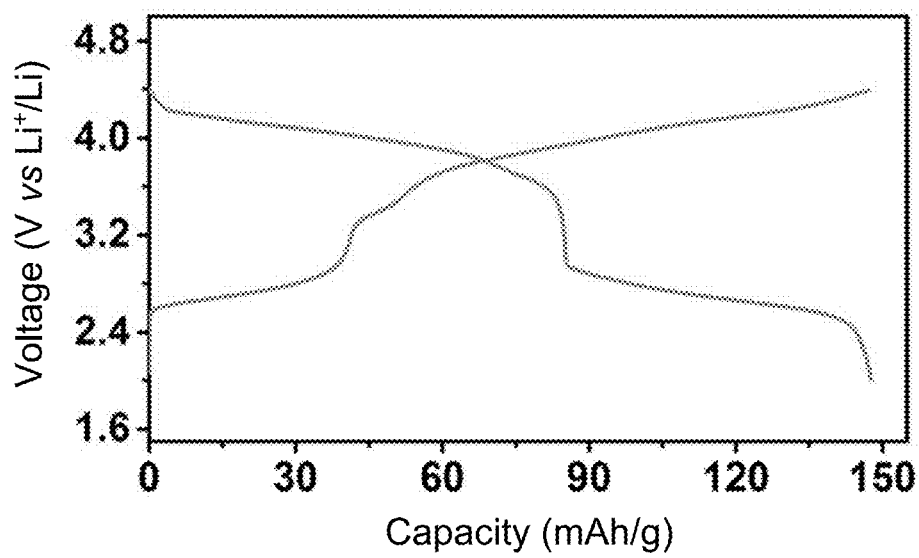
FIG. 8 displays the charge and discharge profiles of Cell 3. The charge and discharge were performed at 0.1 C between 2.0 and 4.4 V vs Li/Li$^+$ at a temperature of 25° C.

FIG. 8 displays the charge and discharge profiles of Cell 3. The charge and discharge were performed at 0.1 C between 2.0 and 4.4 V vs Li/Li$^+$ at a temperature of 25° C. Cell 3 delivered a capacity of approximately 150 mAh/g.

Figure 9:
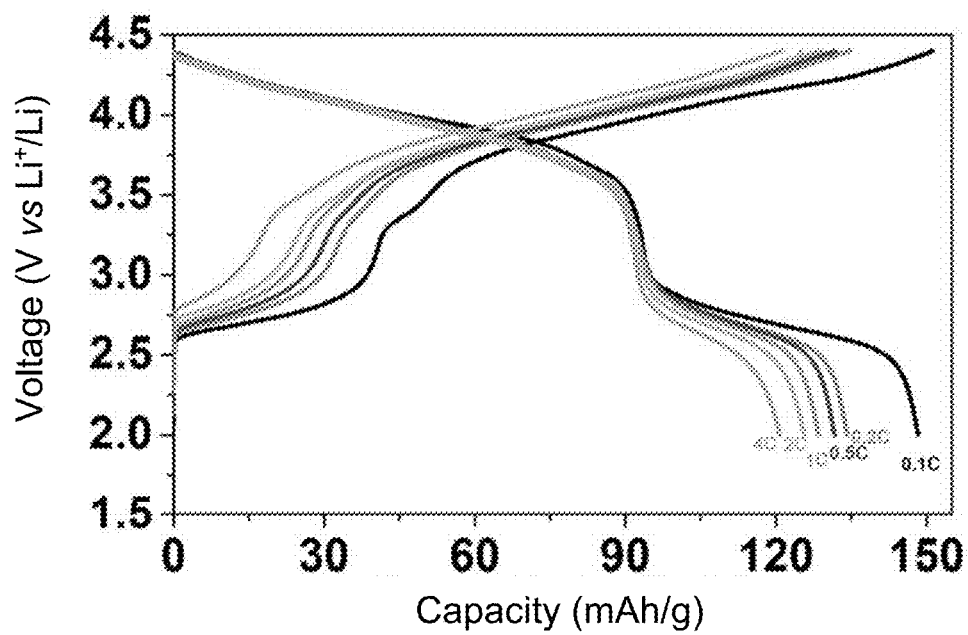
FIG. 9 displays the charge and discharge profiles of Cell 3 at different cycling rates, the charge and discharge being performed at 0.1 C, 0.2 C, 0.5 C, 1 C, 2 C and 4 C and recorded vs Li/Li$^+$ at a temperature of 25° C.

FIG. 9 displays charge and discharge profiles of Cell 3 at different cycling rates. The charge and discharge were performed at 0.1 C, 0.2 C, 0.5 C, 1 C, 2 C and 4 C and recorded vs Li/Li$^+$ at a temperature of 25° C. At a cycling rate of 4 C, Cell 3 delivered a capacity of approximately 121 mAh/g, effectively showing a capacity retention of 80% with increasing cycling rate from 0.1 C to 4 C.

Figure 10:
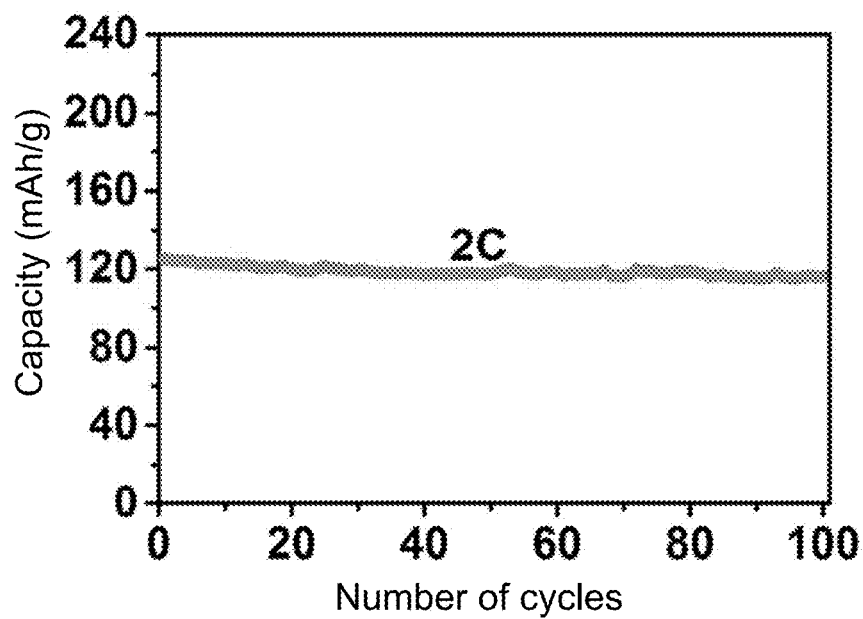
FIG. 10 shows a graph representing the capacity (mAh/g) as a function of the number of cycles for Cell 3. The long cycling experiment was carried out at a constant charge/discharge current of 2 C and the results were recorded vs Li/Li$^+$ at a temperature of 25° C.

FIG. 10 shows a graph representing the capacity (mAh/g) as a function of the number of cycles for Cell 3. The long cycling experiment was carried out at a constant charge/discharge current of 2 C. The results were recorded vs Li/Li$^+$ at a temperature of 25° C. FIG. 10 shows a capacity retention of about 93.4% after 100 cycles.

c) Electrochemical Behavior of P2-Type $Na_{0.67}Ni_{0.33}Mn_{0.67}O_2$

This example illustrates the electrochemical behavior of a P2-type layered $Na_{0.67}Ni_{0.33}Mn_{0.67}O_2$ material as prepared in Example 1.

Figure 11:
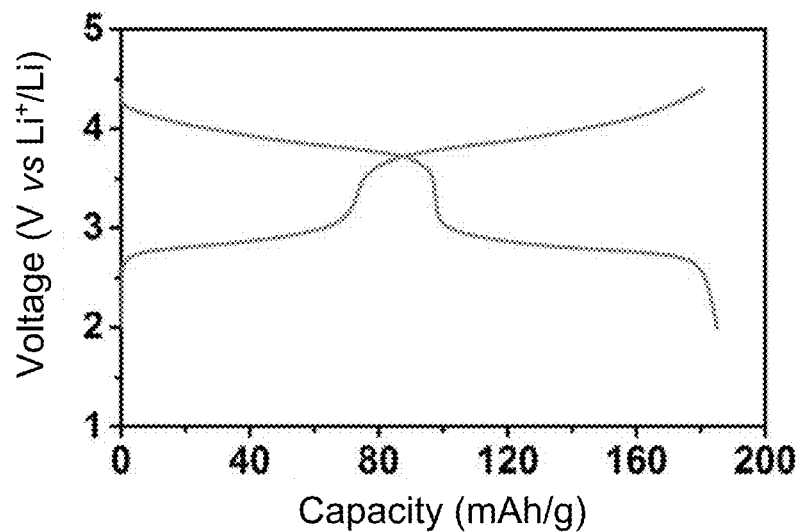
FIG. 11 displays the initial charge and discharge curves of Cell 4. The charge and discharge were performed at 0.1 C between 2.0 and 4.4 V vs Li/Li$^+$ at a temperature of 25° C.

FIG. 11 displays the initial charge and discharge curves of Cell 4. The charge and discharge were performed at 0.1 C between 2.0 and 4.4 V vs Li/Li$^+$ at a temperature of 25° C. Cell 4 delivered a capacity of approximately 182 mAh/g.

Figure 12:
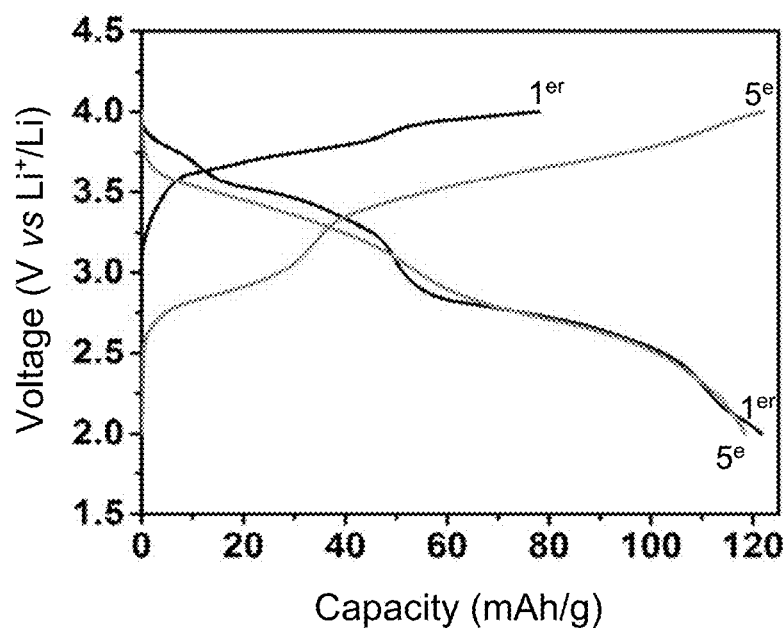
FIG. 12 displays two charge and discharge profiles of Cell 5, specifically the first cycle and the fifth cycle. The charge and discharge were performed at 0.3 C between 2.0 and 4.0 V vs Li/Li*at a temperature of 80° C.

FIG. 12 displays two charge and discharge profiles of Cell 5, i.e., the first cycle and the fifth cycle. The charge and discharge were performed at 0.3 C between 2.0 and 4.0 V vs Li/Li$^+$ at a temperature of 80° C. Cell 5 delivered a capacity of approximately 120 mAh/g.

d) Electrochemical Behavior of P2-Type $Na_{0.67}Co_{0.6}Mn_{0.4}O_2$

This example illustrates the electrochemical behavior of a P2-type layered $Na_{0.67}Co_{0.6}Mn_{0.4}O_2$ material as prepared in Example 1.

Figure 13:
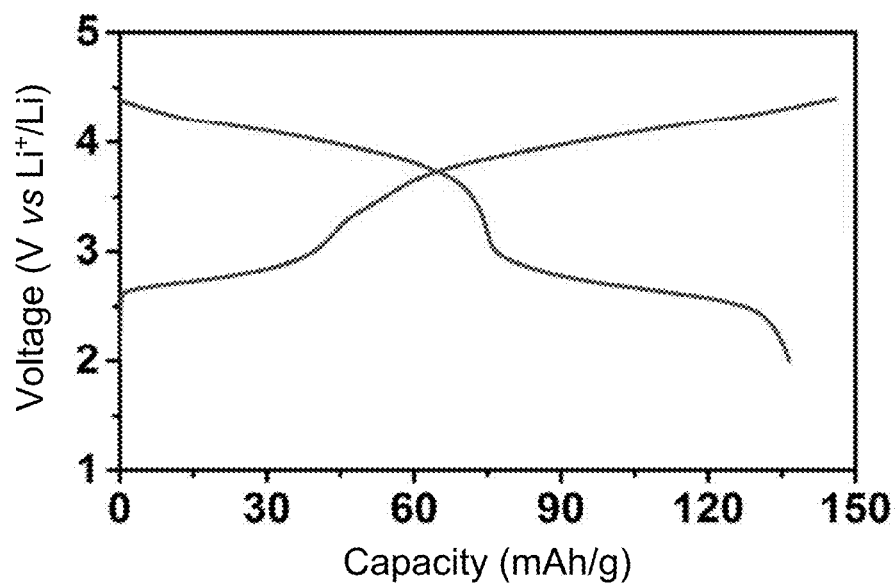
FIG. 13 displays the charge and discharge profiles of Cell 6, the charge and discharge being performed at 0.1 C between 2.0 and 4.4 V vs Li/Li$^+$ at a temperature of 25° C.

FIG. 13 displays the charge and discharge profiles of Cell 6. The charge and discharge were performed at 0.1 C between 2.0 and 4.4 V vs Li/Li$^+$ at a temperature of 25° C. Cell 6 delivered a capacity of approximately 142 mAh/g.

e) Electrochemical Behavior of P2-Type $Na_{0.67}Co_{0.55}Mn_{0.45}O_2$

This example illustrates the electrochemical behavior of a P2-type layered $Na_{0.67}Co_{0.55}Mn_{0.45}O_2$ material as prepared in Example 1.

Figure 14:
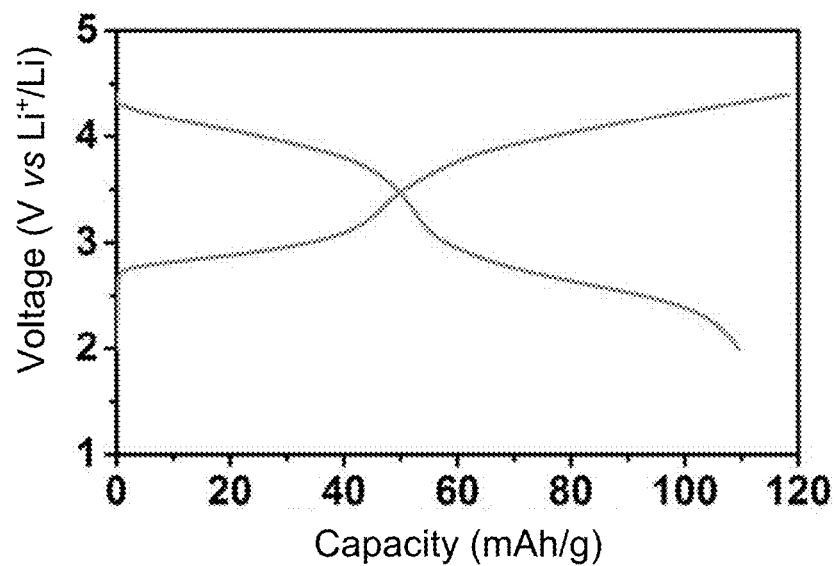
FIG. 14 displays the charge and discharge profiles of Cell 7, the charge and discharge being performed at 0.1 C between 2.0 and 4.4 V vs Li/Li$^+$ at a temperature of 25° C.

FIG. 14 displays the charge and discharge profiles of Cell 7. The charge and discharge were performed at 0.1 C between 2.0 and 4.4 V vs Li/Li$^+$ at a temperature of 25° C. Cell 7 delivered a capacity of approximately 110 mAh/g.

f) Electrochemical Behavior of P2-Type $Na_{0.67}Co_{0.5}Mn_{0.5}O_2$

This example illustrates the electrochemical behavior of a P2-type layered $Na_{0.67}Co_{0.5}Mn_{0.5}O_2$ material as prepared in Example 1.

Figure 15:
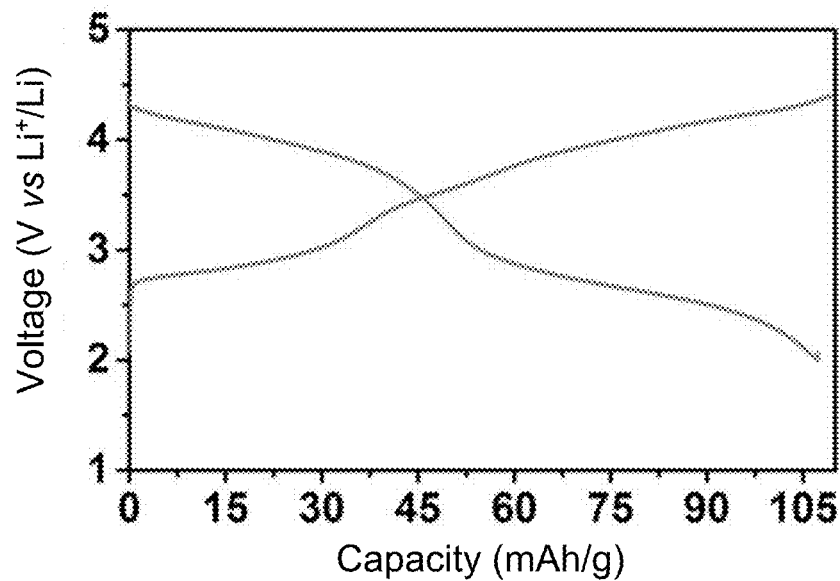
FIG. 15 displays the charge and discharge profiles of Cell 8, the charge and discharge being performed at 0.1 C between 2.0 and 4.4 V vs Li/Li$^+$ at a temperature of 25° C.

FIG. 15 displays the charge and discharge profiles of Cell 8. The charge and discharge were performed at 0.1 C between 2.0 and 4.4 V vs Li/Li$^+$ at a temperature of 25° C. Cell 8 delivered a capacity of approximately 114 mAh/g.

g) Electrochemical behavior of P2-type $Na_{0.67}Co_{0.50}Mn_{0.33}Ti_{0.17}O_2$ This example illustrates the electrochemical behavior of a P2-type layered $Na_{0.67}Co_{0.50}Mn_{0.33}Ti_{0.17}O_2$ material as prepared in Example 1.

Figure 16:
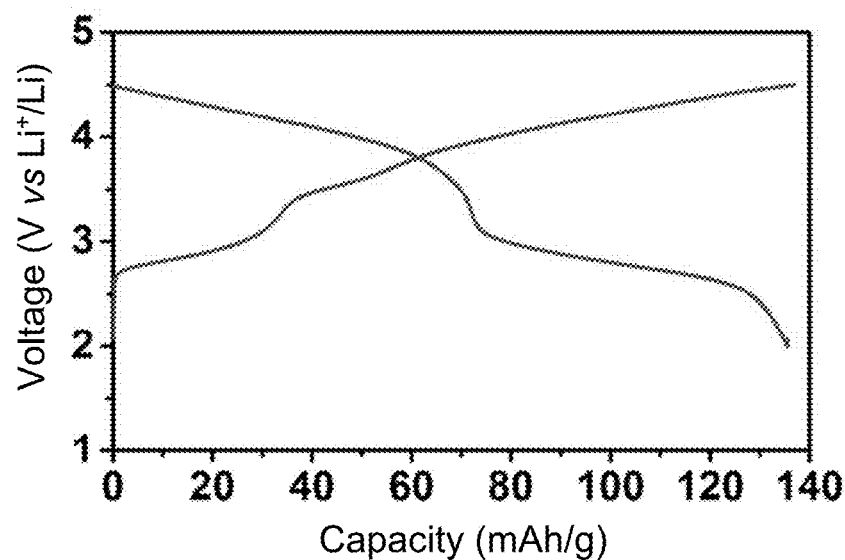
FIG. 16 displays the charge and discharge profiles of Cell 9, the charge and discharge being performed at 0.1 C between 2.0 and 4.5 V vs Li/Li$^+$ at a temperature of 25° C.

FIG. 16 displays the charge and discharge profiles of Cell 9. The charge and discharge were performed at 0.1 C between 2.0 and 4.5 V vs Li/Li$^+$ at a temperature of 25° C. Cell 9 delivered a capacity of approximately 137 mAh/g.

h) Electrochemical Behavior of P2-Type $Na_{0.60}MnO_2$

This example illustrates the electrochemical behavior of a P2-type layered $Na_{0.60}MnO_2$ material as prepared in Example 1.

Figure 17:
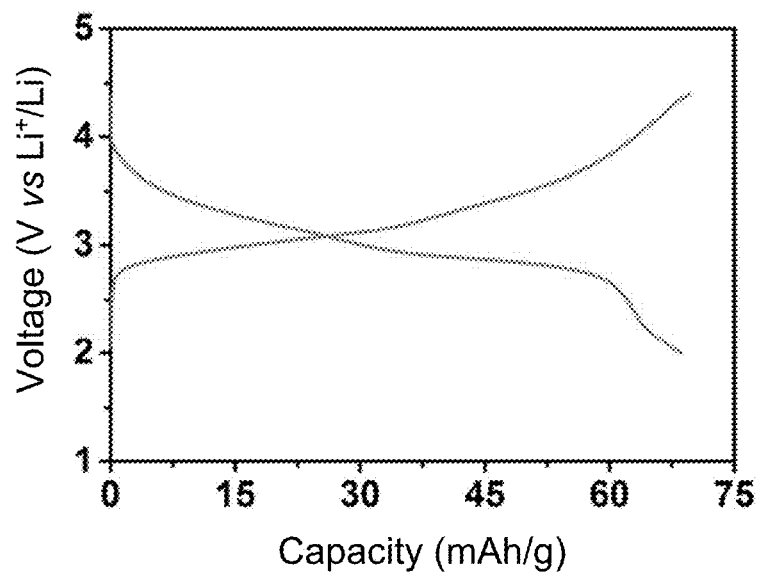
FIG. 17 displays the charge and discharge profiles of Cell 10, the charge and discharge being performed at 0.1 C between 2.0 and 4.4 V vs Li/Li$^+$ at a temperature of 25° C.

FIG. 17 displays the charge and discharge profiles of Cell 10. The charge and discharge were performed at 0.1 C between 2.0 and 4.4 V vs Li/Li$^+$ at a temperature of 25° C. Cell 10 delivered a capacity of approximately 73 mAh/g.

i) Electrochemical behavior of O3-type $NaNi_{0.4}Co_{0.2}Mn_{0.4}O_2$

This example illustrates the electrochemical behavior of a O3-type layered $NaNi_{0.4}Co_{0.2}Mn_{0.4}O_2$ material as prepared in Example 1.

Figure 18:
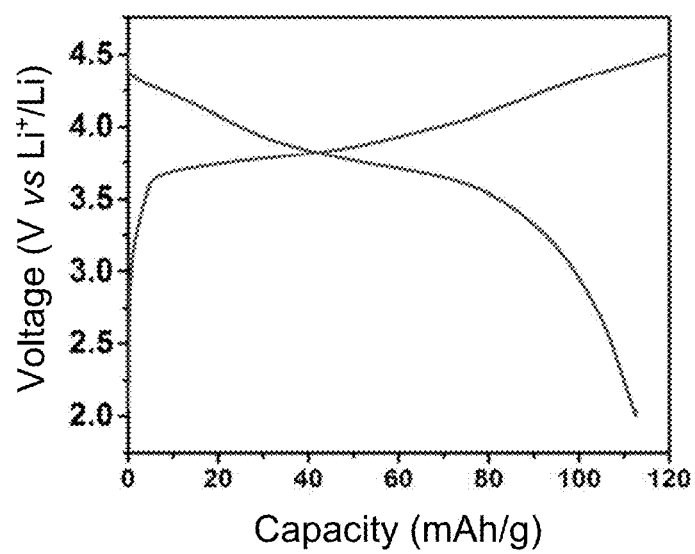
FIG. 18 displays the charge and discharge profiles of Cell 11, the charge and discharge being performed at 0.1 C between 2.0 and 4.4 V vs Li/Li$^+$ at a temperature of 25° C.

FIG. 18 displays the charge and discharge profiles of Cell 11. The charge and discharge were performed at 0.1 C between 2.0 and 4.4 V vs Li/Li$^+$ at a temperature of 25° C. Cell 11 delivered a capacity of approximately 118 mAh/g.

Figure 19:
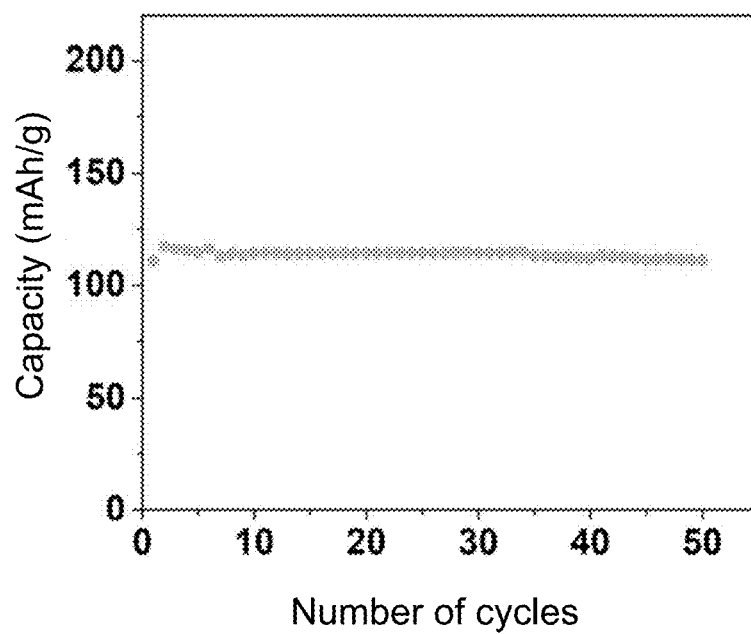
FIG. 19 shows a graph representing the capacity (mAh/g) as a function of the number of cycles for Cell 11. The long cycling experiment was carried out at a constant charge/discharge current of 0.1 C and the results were recorded vs Li/Li$^+$ at a temperature of 25° C.

FIG. 19 shows a graph representing the capacity (mAh/g) as a function of the number of cycles for Cell 11. The long cycling experiment was carried out at a constant charge/discharge current of 0.1 C. The results were recorded vs Li/Li$^+$ at a temperature of 25° C. FIG. 19 shows a good capacity retention after 50 cycles.

Numerous modifications could be made to any of the embodiments described above without departing from the scope of the present invention as contemplated. The references, patents or scientific literature documents referred to in the present application are incorporated herein by reference in their entirety for all purposes.

The invention claimed is:

1. An electrochemical cell comprising a negative electrode, a positive electrode, and an electrolyte, wherein:

the positive electrode comprises an electrode material comprising an electrochemically active material, said electrochemically active material being a P2-type or an O3-type layered sodium metal oxide of formula $Na_xM'_{1-y}M_yO_2$, wherein x is a number such that $0.5 \leq x \leq 1.0$, y is a number such that $0 < y < 1.0$, M is one of Co, Mn, Fe, Ni, Ti, Cr, V, Cu, Sb, or a combination thereof, M' is different from M and is one of Co, Mn, Fe, Ni, Ti, Cr, V, Cu, Sb, or a combination thereof, and the negative electrode comprises metallic lithium.

2. The electrochemical cell according to claim 1, wherein:
the P2-type layered sodium metal oxide is of formula $Na_xM'_{1-y}M_yO_2$, wherein x is a number such that $0.5 \leq x \leq 0.8$, y is as defined in claim 1, M is one of Co, Mn, Fe, Ni, Ti, Cr, V, Cu, or a combination thereof, and M' is different from M and is one of Co, Mn, Fe, Ni, Ti, Cr, V, Cu, or a combination thereof, and
the O3-type layered sodium metal oxide is of formula $Na_xM'_{1-y}M_yO_2$, wherein x is a number such that $0.8 \leq x \leq 1.0$, y is as defined in claim 1, M is one of Co, Mn, Fe, Ni, Ti, Cr, V, Cu, Sb, or a combination thereof, and M' is different from M and is one of Co, Mn, Fe, Ni, Ti, Cr, V, Cu, Sb, or a combination thereof.

3. The electrochemical cell according to claim 1, wherein the electrochemically active material comprises a layered sodium metal oxide of formula $Na_xM'_{1-y}Mn_yO_2$, wherein M' is one of Co, Fe, Ni, Ti, Cr, V, Cu, Sb, or a combination thereof.

4. The electrochemical cell according to claim 1, wherein the electrochemically active material comprises a layered sodium cobalt oxide of formula $Na_xM'_{1-y}Co_yO_2$, wherein M' is one of Mn, Fe, Ni, Ti, Cr, V, Cu, Sb, or a combination thereof.

5. The electrochemical cell according to claim 1, wherein the electrochemically active material comprises a layered sodium metal oxide of formula $Na_x(NiCo)_{1-y}Mn_yO_2$.

6. The electrochemical cell according to claim 1, wherein the electrochemically active material comprises a layered sodium metal oxide of formula $Na_xCo_{1-y}Mn_yO_2$.

7. The electrochemical cell according to claim 1, wherein the electrochemically active material comprises a layered sodium metal oxide of formula $Na_xNi_{1-y}Mn_yO_2$.

8. The electrochemical cell according to claim 1, wherein the electrochemically active material comprises a layered sodium metal oxide of formula $Na_x(CoTi)_{1-y}Mn_yO_2$.

9. The electrochemical cell according to claim 1, further comprising an electronically conductive material.

10. The electrochemical cell according to claim 9, wherein the electronically conductive material comprises carbon fibers or carbon black.

11. The electrochemical cell according to claim 9, wherein the electronically conductive material is selected from the group consisting of carbon black, acetylene black, graphite, graphene, carbon fibers, carbon nanofibers, carbon nanotubes, and their combinations.

12. The electrochemical cell according to claim 1, further comprising a binder selected from the group consisting of a polymeric binder of polyether type, a fluorinated polymer, and a water-soluble binder.

13. The electrochemical cell according to claim 12, wherein the fluorinated polymer is polyvinylidene fluoride (PVdF).

14. The electrochemical cell according to claim 12, wherein the polymeric binder of polyether type is branched, crosslinked, or both branched and crosslinked, or wherein the polymeric binder of polyether type is based on polyethylene oxide (PEO).

15. The electrochemical cell according to claim 1, wherein the electrode material of the positive electrode is on a current collector.

16. The electrochemical cell according to claim 1, wherein the electrolyte is a liquid electrolyte comprising a salt in a solvent, or is a gel electrolyte comprising a salt in a solvent, or is a solid polymer electrolyte comprising a salt in a solvating polymer.

17. A battery comprising at least one electrochemical cell as defined in claim 1.

18. The electrochemical cell according to claim 1, wherein the electrochemically active material is selected from the group consisting of $Na_{0.67}Co_{0.67}Mn_{0.33}O_2$, $Na_{0.67}Ni_{0.33}Mn_{0.67}O_2$, $Na_{0.67}Co_{0.6}Mn_{0.4}O_2$, $Na_{0.67}Co_{0.55}Mn_{0.45}O_2$, $Na_{0.67}Co_{0.5}Mn_{0.5}O_2$, $Na_{0.67}Co_{0.50}Mn_{0.33}Ti_{0.17}O_2$, $NaNi_{0.4}Co_{0.2}Mn_{0.4}O_2$, and $NaNi_{0.33}Fe_{0.33}Mn_{0.33}O_2$.

\* \* \* \* \*